(12) United States Patent
Chen et al.

(10) Patent No.: US 7,694,186 B2
(45) Date of Patent: Apr. 6, 2010

(54) METHOD FOR ACTUATING A SYSTEM ON CHIP (SOC) AND COMPUTER SYSTEM MEDIUM THEREOF

(75) Inventors: Hsin-Chuan Chen, Taipei (TW); Meng-Tao Lee, Taipei (TW)

(73) Assignee: Prolific Technology Inc., Taipei (TW)

( * ) Notice: Subject to any disclaimer, the term of this patent is extended or adjusted under 35 U.S.C. 154(b) by 426 days.

(21) Appl. No.: 11/892,618

(22) Filed: Aug. 24, 2007

(65) Prior Publication Data
US 2008/0133966 A1 Jun. 5, 2008

(30) Foreign Application Priority Data
Nov. 30, 2006 (TW) .............................. 95144538 A

(51) Int. Cl.
*G06F 11/00* (2006.01)
(52) U.S. Cl. .............................. 714/42; 714/32; 702/177; 702/120
(58) Field of Classification Search ........................ None
See application file for complete search history.

(56) References Cited

U.S. PATENT DOCUMENTS

| | | | | |
|---|---|---|---|---|
| 7,149,924 | B1 * | 12/2006 | Zorian et al. | 714/30 |
| 7,519,873 | B2 * | 4/2009 | Shin et al. | 714/703 |
| 2004/0039967 | A1 * | 2/2004 | Park | 714/30 |
| 2005/0015215 | A1 * | 1/2005 | Zhang | 702/119 |
| 2005/0141318 | A1 * | 6/2005 | Lee | 365/226 |
| 2005/0289287 | A1 * | 12/2005 | Shin et al. | 711/1 |
| 2007/0180328 | A1 * | 8/2007 | Cornwell et al. | 714/42 |

* cited by examiner

*Primary Examiner*—Christopher S McCarthy
(74) *Attorney, Agent, or Firm*—Rabin & Berdo, P.C.

(57) ABSTRACT

A method for actuating a system on chip (SOC) includes the following steps. First, determine whether the SOC is connected to a computer system via a communication connection. If no, determine whether a non-volatile memory of the SOC has an initial flag signal. If yes, read correction information stored in the non-volatile memory in response to the initial flag signal and set a corresponding first register of the SOC according to the correction information.

21 Claims, 2 Drawing Sheets

METHOD FOR ACTUATING A SYSTEM ON CHIP (SOC) AND COMPUTER SYSTEM MEDIUM THEREOF

This application claims the benefit of Taiwan application Serial No. 095144538, filed Nov. 30, 2006, the subject matter of which is incorporated herein by reference.

BACKGROUND OF THE INVENTION

1. Field of the Invention

The invention relates in general to a method for actuating a system on chip (SOC), and more particularly to an actuating method of debugging a read only memory (ROM) via a non-volatile memory.

2. Description of the Related Art

A read only memory (ROM) is normally disposed in a conventional SOC for storing setting information. When the system is turned on, the conventional SOC sets a number of registers according to the setting information of the ROM to complete a turn-on operation. However, the conventional SOC has a number of issues as follows.

Owing that the setting information stored in the ROM has to be recorded in the ROM in the manufacturing process of the SOC, the setting information cannot be modified after the SOC has been manufactured. Therefore, if the setting information or program codes of the ROM are found to be defective after the SOC is fabricated, the setting information or program codes can only be modified by remaking the SOC and the defective SOC has to be discarded. As a result, the conventional SOC has a higher manufacturing cost due to the remaking requirement.

Besides, once the specification, product symbol or capacity of peripheral hardware connected to the SOC needs to be temporarily changed due to industrial consideration, the setting information of the ROM of the conventional SOC has to be re-made to modify the setting information recorded in the ROM so as to work with the peripheral hardware having the new specification, product symbol or capacity. Therefore, the conventional SOC has also a drawback of lacking elasticity of being compatible with various kinds of peripheral hardware.

SUMMARY OF THE INVENTION

The invention is directed to a method for actuating a SOC and computer system medium thereof, which can effectively resolve the issues of the conventional SOC having higher cost and lacking elasticity of being compatible with the peripheral hardware.

According to a first aspect of the present invention, a method for actuating a system on chip (SOC) is provided. The method comprises (a) determining whether the SOC is connected to a computer system via a communication connection, and if no, performing a step (b); (b) determining whether a non-volatile memory of the SOC has a initial flag signal and if yes, performing a step (c); and (c) reading correction information stored in the non-volatile memory in response to the initial flag signal and setting a corresponding first register of the SOC according to the correction information.

According to a second aspect of the present invention, a computer system medium is provided. The computer system medium has an operational command collection of a SOC for performing an actuating method of the SOC. The actuating method comprises (a) determining whether the SOC is connected to a computer system via a communication connection, and if no, performing a step (b); (b) determining whether a non-volatile memory of the SOC has a initial flag signal and if yes, performing a step (c); and (c) reading correction information stored in the non-volatile memory in response to the initial flag signal and setting a corresponding first register of the SOC according to the correction information.

The invention will become apparent from the following detailed description of the preferred but non-limiting embodiments. The following description is made with reference to the accompanying drawings.

DETAILED DESCRIPTION OF THE INVENTION

Figure 1:
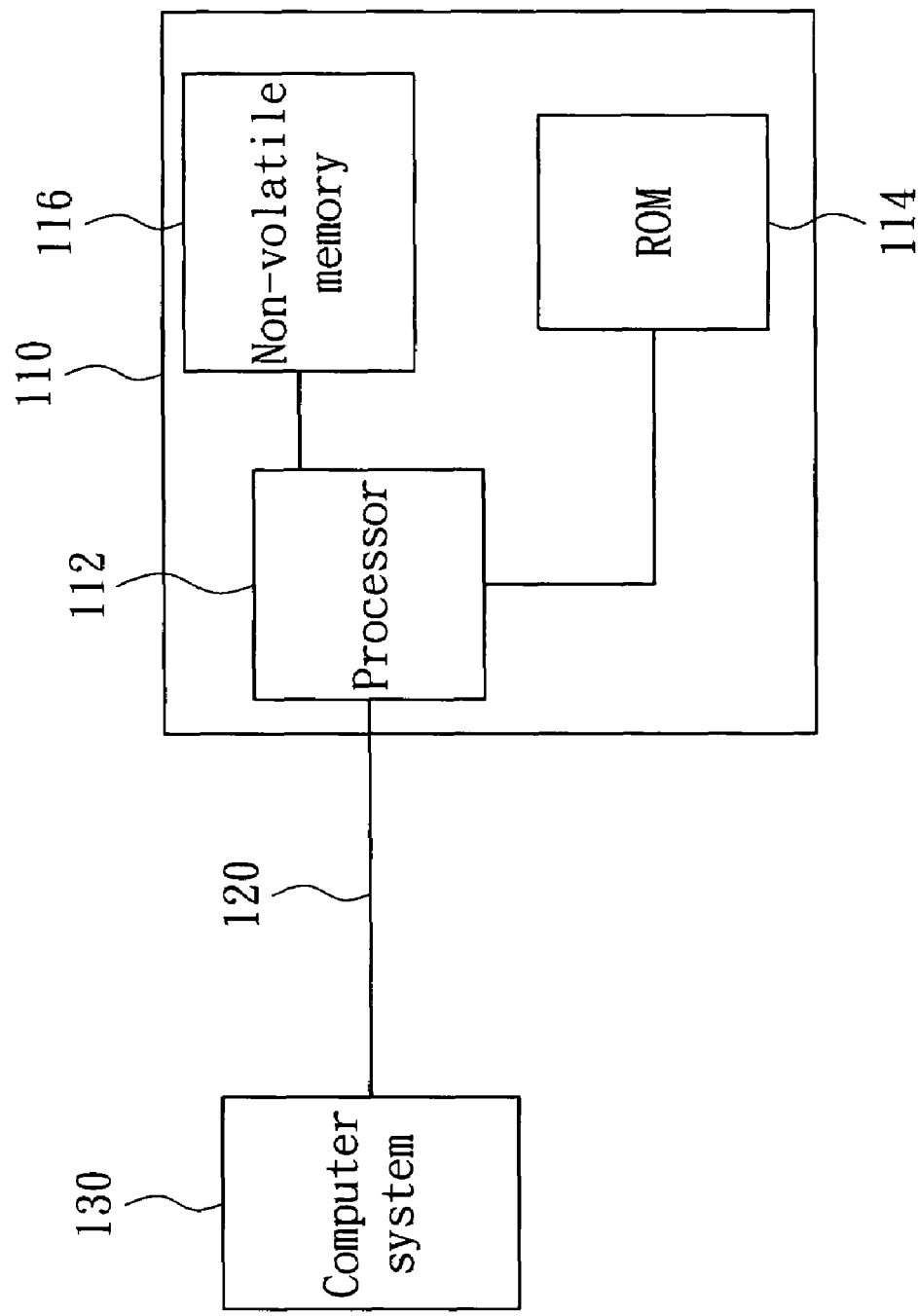
FIG. 1 is a block diagram of a SOC and a computer system in a SOC actuating method according to a preferred embodiment of the invention.

Referring to FIG. 1, a block diagram of a SOC and a computer system in a SOC actuating method according to a preferred embodiment of the invention is shown. A SOC 100 includes a processor 112, read only memory (ROM) 114 and non-volatile memory 116. The ROM 114 is used for storing several pieces of register information (not shown in the figure). When the SOC 110 is turned on, the processor 112 sets a number of registers in the SOC 110 according to the register information.

When the first register information of the ROM 114 corresponding to the first register has errors to result in an error operation of the SOC 110, the user can connect the SOC 110 to a computer system 130 via communication connection 120 such that the SOC 110 can communicate with the computer system 130 via a control interface. The user can also provide commands via the control interface of the computer system to perform control and operational stimulations on the SOC 110 so as to find out the optimal value of the first register information and store the optimal value in a non-volatile memory 116 of the SOC 110 as correction information. Therefore, when the SOC 110 is turned on, the first register can be set according to the correction information of the non-volatile memory 116 to effectively resolve the issue of an error operation of the SOC 110 due to faulty first register information.

For example, the ROM 114 of the embodiment is a computer medium storing an operational command collection of the SOC 110. As the SOC 110 turned on, the processor 112 performs a method of actuating the SOC 110 according to the operational command collection. The processor 112 is used for performing the corresponding operations in response to commands provided by the computer system 130 and reading correction information of the non-volatile memory 116 to set the corresponding first register.

Figure 2:
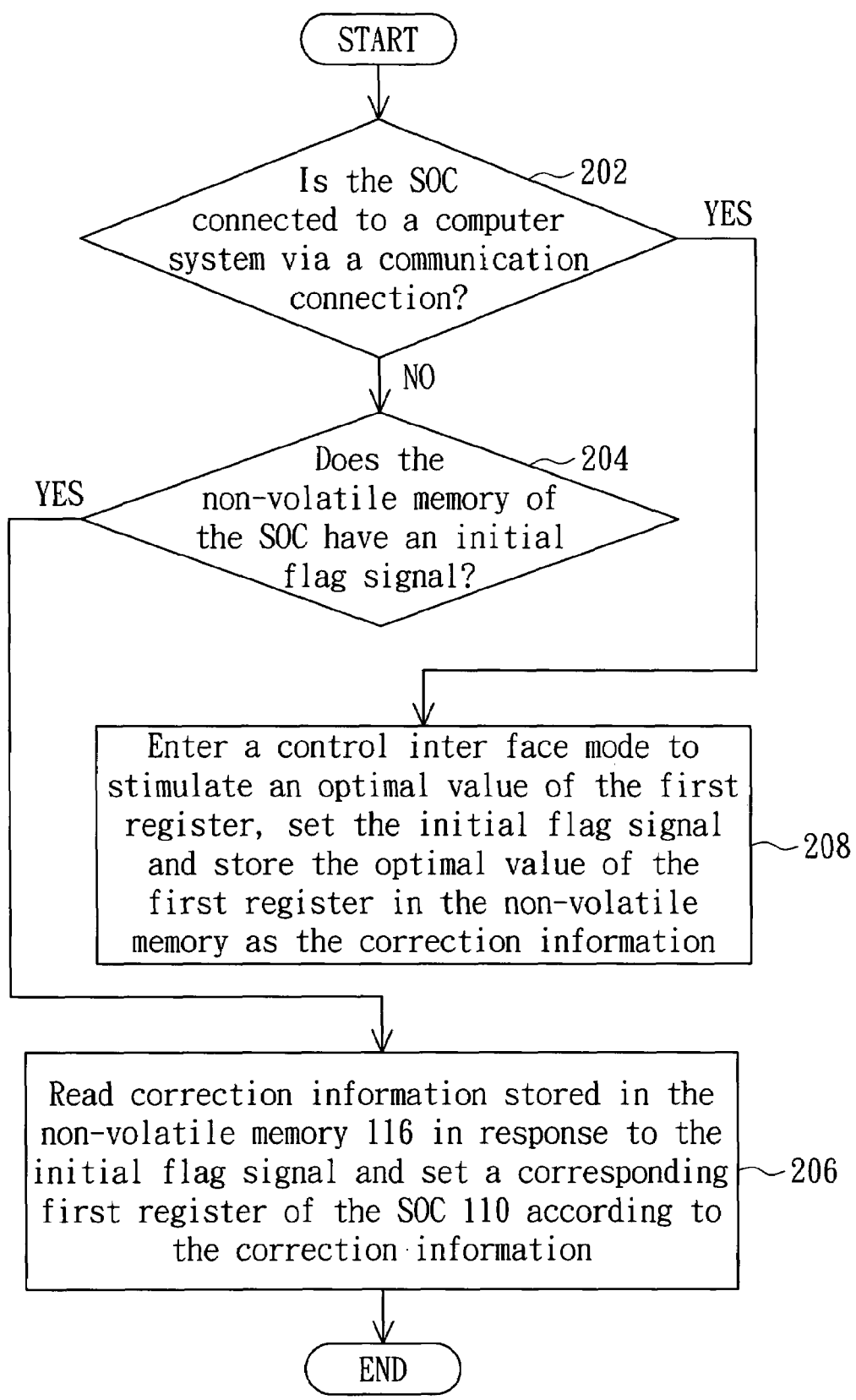
FIG. 2 is a flow chart of the method for actuating a SOC according to the preferred embodiment of the invention.

The steps of the method for actuating the SOC 110 of the embodiment are shown in FIG. 2. Referring to FIG. 2, a flow chart of the method for actuating a SOC according to the preferred embodiment of the invention is shown. First, in step 202, the processor 112 determines whether the SOC 110 is connected to the computer system 130 via the communication connection 120. If no, perform a step 204 in which the processor 112 determines whether the non-volatile memory 116 has an initial flag signal. If the non-volatile memory 116 has the initial flag signal, perform a step 206 in which the processor 112 reads the correction information stored in the non-volatile memory 116 in response to the initial flag signal and accordingly sets the corresponding first register in the SOC 110.

In the step 202, the processor 112 determines whether the SOC 110 is connected to the computer system 130 via the communication connection 120. If yes, perform a step 208 in which the SOC 110 enters a control interface mode. At the time, the computer system 130 performs control and operational stimulations on the SOC 110 via the control interface to find out the optimal value of the first register. The computer system 130 further sets a flag signal via the control interface and stores the optimal value of the first register in the non-volatile memory 116 as the correction information. After the step 208, for example, the user re-starts the SOC 110 and removes the communication connection 120. Therefore, the SOC 110 performs the steps 202~206 to set the first register according to the correction information stored in the non-volatile memory 116.

The control interface of the embodiment supports a number of user defined commands. The user can provide the user defined commands to the SOC 110 via the control interface of the computer system 130 to control the operations of the SOC 110. In the following description, information fields and functions of several user defined commands of the embodiment will be illustrated.

For example, the control interface supports an address read command including a target address field with target addresses. In the embodiment, the address read command is R for instance. When the user is to read register information in a 32-bit target address BFC00600, the user inputs the address read command: R bfc00600 via the control interface. The processor 112 reads the register information corresponding to the target address bfc00600 in the SOC 110 in response to the address read command.

For example, the control interface supports a register write command including a target address field and a write information field respectively having target addresses and write information of the registers corresponding to the target addresses. The register write command of the embodiment has two formats, such as W and B, for respectively writing information of 32 bits and 8 bits at a time. When the user is to write octal information 01234567 to 32 registers corresponding to the target addresses BFC00600-BFC0061F, the user inputs: W bfc00600 01234567 via the control interface. The processor writes the octal information 01234567 to the 32 registers corresponding to the target addresses BFC00600-BFC0061F in response to the register write command.

When the user is to write octal information 67 to 8 registers corresponding to the target addresses BFC00600-BFC00607, the user inputs: B bcf00600 00000067 via the control interface. The processor 112 writes the above 8-bit write information 67 to the 8 registers corresponding to the target addresses BFC00600-BFC00607 in response to the register write command. In the SOC 110 of the embodiment, each register is a one-bit register for instance.

For example, the control interface supports an address change command including an address change field with address change information. In the embodiment, the address change command is J for instance. When the user is to change the target address BFC00600 to another target address BFF00600, the user inputs: J bff00600 via the control interface. The processor 112 accesses the register of the SOC 110 corresponding to the target address BFF00600 in response to the address change command.

For example, the control interface supports an initial setting command. The initial setting command of the embodiment is C for instance. When the user is to perform an initial setting operation on the non-volatile memory 116, the user inputs: C via the control interface. The processor 112 performs the initial setting operation on the non-volatile memory 116, clear a memory block of the non-volatile memory 116, and set an initial flag signal in the memory block in response to the initial setting command.

For example, the control interface supports a memory write command including a target address field and a correction information field respectively having target addresses and correction information to be written to the registers corresponding to the target addresses. For example, the memory write command of the embodiment has two formats, such as F and X, for respectively writing 32 bits and 8 bits at a time. When the user is to write a target address BFC00600 and 8-bit correction information 01234567 into the non-volatile memory 116, the user inputs: F bfc00600 01234567 via the control interface. The processor 112 writes the above target address BFC00600 and 8-bit correction information 01234567 into the non-volatile memory 116 in response to the memory write command.

When the user is to write the target address BFC00600 and 8-bit correction information 67 into the non-volatile memory 116, the user inputs: X bfc00600 00000067 via the control interface. The processor 112 writes the above target address BFC00600 and 8-bit correction information 67 into the non-volatile memory 116 in response to the memory write command.

For example, the control interface supports a memory address change command including an address change field with address change information. In the embodiment, the memory address change command is K for instance. When the user is to store the address change command changing the target address BFC00600 to the change address BFF00600 in the non-volatile memory 116, the user inputs: K bff00600 via the control interface. The processor 112 stores the address change command in the non-volatile memory 116 in response to the memory address change command.

For example, the control interface supports a termination setting command. In the embodiment, the termination setting command is E. When the user is to setting a terminal flag signal in the non-volatile memory 116, the user inputs: E via the control interface. The processor 112 sets the terminal flag signal in the non-volatile memory 116 in response to the terminal setting command.

The information of the non-volatile memory 116 between the initial flag signal and termination flag signal is substantially the correction information. When the SOC 110 is turned on, the processor 112, the processor 112 performs the step 204 of the actuating method to determine whether the non-volatile memory 116 has the initial flag signal. Afterward, the processor performs the step 206 of the actuating method to read the correction information of the non-volatile memory 116 between the initial flag signal and the termination flag signal and accordingly set the corresponding first register of the SOC 110.

For example, the control interface supports a display command. In the embodiment, the terminal setting command is T. When the user obtains the correction information of the non-volatile memory 116, the user inputs: T via the control interface. The processor 112 displays the information of the non-volatile memory 116 between the initial and termination flag signals on the output device of the computer system 130 in response to the display command. In the embodiment, the output device is a display for instance.

In the embodiment, the control interface has console function and the communication connection is a RS-232 port for instance.

The method for actuating a SOC and computer system medium thereof disclosed by the embodiment can find out optical values of the corresponding registers via the control interface between the computer system and the SOC according to the user defined commands and store the optimal values in the non-volatile memory of the SOC. Therefore, when the SOC is turned on next time, the SOC can set the corresponding registers according to the correction information of the non-volatile memory. The method for actuating a SOC and computer system medium of the embodiment can effectively resolve the drawbacks of the conventional SOC which cannot modify the information in the register of the ROM resulting in a higher cost and cannot modify to be compatible with peripheral hardware of different specifications. Substantially, the method for actuating a SOC and computer system medium thereof of the embodiment have advantages of being capable of modifying register information of the ROM according to peripheral hardware of different specifications, and having a lower cost and elasticity of being compatible with the peripheral hardware of different specifications.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for actuating a system on chip (SOC), comprising:
   (a) determining whether the SOC is connected to a computer system via a communication connection, and if no, performing a step (b);
   (b) determining whether a non-volatile memory of the SOC has a initial flag signal and if yes, performing a step (c); and
   (c) reading correction information stored in the non-volatile memory in response to the initial flag signal and setting a corresponding first register of the SOC according to the correction information.

2. The method according to claim 1, wherein the step (a) further comprises determining whether the SOC is connected to the computer system via the communication connection and if yes, performing steps of:
   setting the SOC to enter a control interface mode and performing an operational stimulation on the SOC in response to a command provided by the computer system via a control interface to stimulate an optimal value of the first register;
   setting the initial flag signal; and
   storing the optimal value of the first register in the non-volatile memory as the correction information.

3. The method according to claim 2, wherein the control interface supports an address read command, the address read command comprises a first target address, and the SOC reads information of the first register corresponding to the first target address in response to the address read command.

4. The method according to claim 2, wherein the control interface supports a register write command and the SOC writes test information to the first register in response to the register write command for the operational stimulation of the SOC.

5. The method according to claim 2, wherein the control interface supports an address change command, the SOC changes a first target address to a second target address in response to the address change command and the first and the second target addresses are corresponding to the first register and a second register of the SOC, respectively.

6. The method according to claim 2, wherein the control interface supports an initial setting command and the SOC clears information of a memory block in the non-volatile memory and sets the initial flag signal in response to the initial setting command.

7. The method according to claim 2, wherein the control interface supports a memory information write command and the SOC writes the correction information and a first target address into the memory block in response to the memory information write command, and the first target address is corresponding to the first register in the SOC.

8. The method according to claim 2, wherein the control interface supports a memory address change command and the SOC writes the address change command into the memory block in response to the memory address change command.

9. The method according to claim 2, wherein the control interface supports a termination setting command and the SOC sets a termination flag signal in the memory block in response to the termination setting command.

10. The method according to claim 2, wherein the control interface supports a display command and the SOC displays the correction information in response to the display command.

11. A computer system medium, having an operational command collection of a SOC for performing an actuating method of the SOC, the actuating method comprising:
    (a) determining whether the SOC is connected to a computer system via a communication connection, and if no, performing a step (b);
    (b) determining whether a non-volatile memory of the SOC has a initial flag signal and if yes, performing a step (c); and
    (c) reading correction information stored in the non-volatile memory in response to the initial flag signal and setting a corresponding first register of the SOC according to the correction information.

12. The computer system medium according to claim 11, wherein the step (a) further comprises determining whether the SOC is connected to the computer system via the communication connection and if yes, performing steps of:
    Setting the SOC to enter a control interface mode and performing an operational stimulation on the SOC in response to a command provided by the computer system via a control interface to stimulate an optimal value of the first register;
    setting the initial flag signal; and
    storing the optimal value of the first register in the non-volatile memory as the correction information.

13. The computer system medium according to claim 12, wherein the control interface supports an address read command, the address read command comprises a first target address, and the SOC reads information of the first register corresponding to the first target address in response to the address read command.

14. The computer system medium according to claim 12, wherein the control interface supports a register write command and the SOC writes test information to the first register in response to the register write command for the operational stimulation of the SOC.

15. The computer system medium according to claim 12, wherein the control interface supports an address change command, the SOC changes a first target address to a second target address in response to the address change command and the first and the second target addresses are corresponding to the first register and a second register of the SOC.

16. The computer system medium according to claim 12, wherein the control interface supports an initial setting command and the SOC clears information of a memory block in the non-volatile memory and sets the initial flag signal in response to the initial setting command.

17. The computer system medium according to claim 12, wherein the control interface supports a memory information write command and the SOC writes the correction information and a first target address into the memory block in response to the memory information write command, and the first target address is corresponding to the first register in the SOC.

18. The computer system medium according to claim 12, wherein the control interface supports a memory address change command and the SOC writes the address change command into the memory block in response to the memory address change command.

19. The computer system medium according to claim 12, wherein the control interface supports a termination setting command and the SOC sets a termination flag signal in the memory block in response to the termination setting command.

20. The computer system medium according to claim 12, wherein the control interface supports a display command and the SOC displays the correction information in response to the display command.

21. The computer system medium according to claim 11, wherein the computer system communicates with the SOC via a serial port.

* * * * *